United States Patent
Takatsukasa

(10) Patent No.: US 10,411,881 B2
(45) Date of Patent: Sep. 10, 2019

(54) DATA PROCESSING APPARATUS, METHOD FOR PROCESSING DATA, AND MEDIUM

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 158 days.

(21) Appl. No.: 15/494,688

(22) Filed: Apr. 24, 2017

(65) Prior Publication Data

US 2017/0353300 A1 Dec. 7, 2017

(30) Foreign Application Priority Data

Jun. 1, 2016 (JP) ................................ 2016-110105

(51) Int. Cl.
*H04L 9/06* (2006.01)
*G06F 21/60* (2013.01)
*G09C 1/00* (2006.01)

(52) U.S. Cl.
CPC .......... *H04L 9/0631* (2013.01); *G06F 21/602* (2013.01); *G09C 1/00* (2013.01); *H04L 2209/16* (2013.01)

(58) Field of Classification Search
CPC . H04L 9/0631; H04L 2209/16; G06F 21/602; G09C 1/00
See application file for complete search history.

(56) References Cited

U.S. PATENT DOCUMENTS

| 6,992,783 | B1 | 1/2006 | Sumiuchi |
| 10,122,493 | B2 * | 11/2018 | Lee ................... H04N 21/2383 |
| 2006/0184765 | A1 * | 8/2006 | Krueger .................. G06F 7/76 712/4 |
| 2013/0275729 | A1 * | 10/2013 | Abraham .............. G06F 9/3001 712/221 |
| 2015/0163051 | A1 | 6/2015 | Suzuki |
| 2017/0090921 | A1 * | 3/2017 | Hughes ............... G06F 9/30032 |

(Continued)

FOREIGN PATENT DOCUMENTS

| JP | 2000-022974 | 1/2000 |
| JP | 2003-110869 | 4/2003 |
| JP | 2008-048099 | 2/2008 |

(Continued)

OTHER PUBLICATIONS

"Handbook of applied algorithms solving scientific, engineering and practical problems" Edited by Amiya Nayak Copyright c 2008 by John Wiley & Sons, Inc (Year: 2008).*

(Continued)

*Primary Examiner* — Harunur Rashid
*Assistant Examiner* — Bassam A Noaman
(74) *Attorney, Agent, or Firm* — IPUSA, PLLC

(57) ABSTRACT

A data processing apparatus for rearranging multiple items of data to be input, includes a processor; a memory; and an input unit configured to receive as input a rearrangement number with which a rearrangement pattern of the data can be identified. The processor executes calculating a rearrangement destination for each of the items of the data based on the rearrangement number; and rearranging the data based on the rearrangement destinations.

8 Claims, 13 Drawing Sheets

(56) References Cited

U.S. PATENT DOCUMENTS

2017/0185413 A1\* 6/2017 Mishra .................. G06F 9/3887

FOREIGN PATENT DOCUMENTS

| JP | 2014-016584 | 1/2014 |
|----|-------------|--------|
| JP | 2015-165174 | 9/2015 |
| WO | 2014/003117 | 1/2014 |

OTHER PUBLICATIONS

Douglas R. Stinson (Author), Koichi Sakurai (Translation supervisor), "Cryptography: Theory and Practice," Japan, Kyoritsu Shuppan Co., Ltd., Nov. 1, 1996, First edition first printing, pp. 19-21 (Document disclosing a well-known technique), with Original English language version of this document.

Japanese Office Action for Japanese Patent Application No. 2016-110105 dated Feb. 7, 2017, with partial translation.

\* cited by examiner

FIG.3
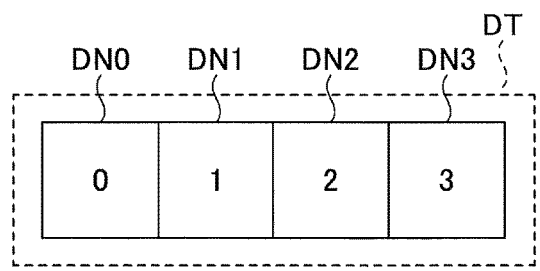
FIG.4A                FIG.4B
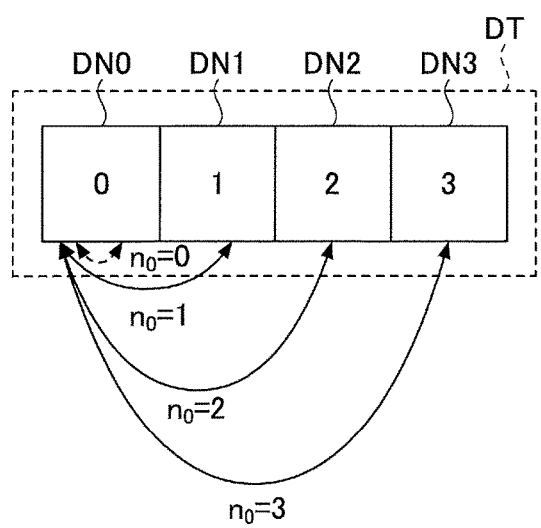 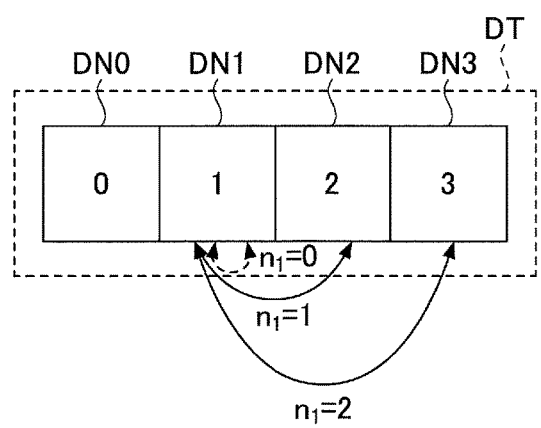

FIG.7

| REARRANGEMENT NUMBER (n) | REARRANGEMENT PATTERN | REARRANGEMENT DESTINATION OF 0TH DATA ($n_0$) | REARRANGEMENT DESTINATION OF 1ST DATA ($n_1$) | REARRANGEMENT DESTINATION OF 2ND DATA ($n_2$) |
|---|---|---|---|---|
| 0 | 0 1 2 3 | 0 | 0 | 0 |
| 1 | 1 0 2 3 | 1 | 0 | 0 |
| 2 | 2 1 0 3 | 2 | 0 | 0 |
| 3 | 3 1 2 0 | 3 | 0 | 0 |
| 4 | 0 2 1 3 | 0 | 1 | 0 |
| 5 | 1 2 0 3 | 1 | 1 | 0 |
| 6 | 2 0 1 3 | 2 | 1 | 0 |
| 7 | 3 2 1 0 | 3 | 1 | 0 |
| 8 | 0 3 2 1 | 0 | 2 | 0 |
| 9 | 1 3 2 0 | 1 | 2 | 0 |
| 10 | 2 3 0 1 | 2 | 2 | 0 |
| 11 | 3 0 2 1 | 3 | 2 | 0 |
| 12 | 0 1 3 2 | 0 | 0 | 1 |
| 13 | 1 0 3 2 | 1 | 0 | 1 |
| 14 | 2 1 3 0 | 2 | 0 | 1 |
| 15 | 3 1 0 2 | 3 | 0 | 1 |
| 16 | 0 2 3 1 | 0 | 1 | 1 |
| 17 | 1 2 3 0 | 1 | 1 | 1 |
| 18 | 2 0 3 1 | 2 | 1 | 1 |
| 19 | 3 2 0 1 | 3 | 1 | 1 |
| 20 | 0 3 1 2 | 0 | 2 | 1 |
| 21 | 1 3 0 2 | 1 | 2 | 1 |
| 22 | 2 3 1 0 | 2 | 2 | 1 |
| 23 | 3 0 1 2 | 3 | 2 | 1 |

FIG.8

| NUMBER OF DATA ITEMS (N) | NUMBER OF BITS REQUIRED FOR HOLDING N ITEMS OF DATA OF $\log_2(N)$ BITS ($N \times \log_2(N)$) | NUMBER OF BITS REQUIRED FOR REPRESENTING REARRANGEMENT OF N ITEMS OF DATA $\log_2(N!)$ | DATA VOLUME (BYTE) |
|---|---|---|---|
| 4 | 8 | 4.584962501 | 1 |
| 8 | 24 | 15.29920802 | 2 |
| 16 | 64 | 44.25014047 | 6 |
| 32 | 160 | 117.6632637 | 15 |
| 64 | 384 | 295.9951439 | 37 |
| 128 | 896 | 716.1617221 | 90 |
| 256 | 2048 | 1683.996287 | 211 |
| 512 | 4608 | 3875.166122 | 485 |
| 1024 | 10240 | 8769.006144 | 1097 |

DATA PROCESSING APPARATUS, METHOD FOR PROCESSING DATA, AND MEDIUM

CROSS-REFERENCE TO RELATED APPLICATIONS

This application is based upon and claims the benefit of priority of the prior Japanese Priority Application No. 2016-110105 filed on Jun. 1, 2016, the entire contents of which are hereby incorporated by reference.

TECHNICAL FIELD

The present disclosure relates to a data processing apparatus, a method for processing data, and a medium.

BACKGROUND

Conventionally, a method for converting data has been known that uses a table such as an LUT (Look Up Table) representing the relationship between input and output, namely, between data before conversion and data after conversion.

For example, an image-processing apparatus such as s color ink-jet printer first compresses a conversion table in which color components constituting image data are arranged, and stores it as a compressed inversion table. Then, when restoring the data, the image-processing apparatus expands the compressed conversion table, and executes interpolation based on the expanded compressed conversion table to convert the input image data. As such, the method has been known that makes the data volume of a table to be stored smaller (see, for example, Patent document 1).

In addition, in order to convert input image data into output image data in a color correction process that uses a color correction table, an image processing apparatus compresses the color correction table, and stores it in a fixed way, and when executing conversion, expands the color correction table and executes the color correction. As such, the method has been known that makes the data volume of a table to be stored smaller (see, for example, Patent document 2).

As another case, in image processing, an image processing apparatus first compresses image data and LUT data according to a predetermined compression scheme, and stores them in the memory. In addition, the image processing apparatus has a DMA (Direct Memory Access) controller that transmits the compressed LUT data read out of the memory to an expansion part to expand the data, and a memory to store the expanded LUT data. With such a configuration, a method has been known that works on the configuration in which a dedicated unit for expanding the LUT data is omitted (see, for example, Patent document 3).

PRIOR ART DOCUMENTS

Patent Documents

[Patent Document 1] Japanese Unexamined Patent Application Publication No. 2000-22974
[Patent Document 2] Japanese Unexamined Patent Application Publication No. 2003-110869
[Patent Document 3] No. Japanese Unexamined Patent Application Publication No. 2008-48099

SUMMARY

However, with such conventional methods, there may be cases where a large data volume is required for rearrangement of data.

It is an object of an aspect in the present disclosure to make the data volume required for rearrangement of data smaller.

According to an embodiment, a data processing apparatus for rearranging multiple items of data to be input, includes a processor; a memory; and an input unit configured to receive as input a rearrangement number with which a rearrangement pattern of the data can be identified. The processor executes calculating a rearrangement destination for each of the items of the data based on the rearrangement number; and rearranging the data based on the rearrangement destinations.

It is possible to make the data volume required for rearrangement of data smaller.

BRIEF DESCRIPTION OF DRAWINGS

FIG. 3 is a schematic view illustrating an example of objective data according to an embodiment;

FIGS. 4A-4B are schematic views illustrating an example of rearrangement destinations according to an embodiment;

FIG. 7 is a diagram illustrating an example of rearrangement numbers, rearrangement destinations, and rearrangement patterns in the case of "N=4" according to an embodiment in the present disclosure;

FIG. 8 is a diagram illustrating an example of the data volume required for rearrangement of data according to an embodiment in the present disclosure;

DESCRIPTION OF EMBODIMENTS

In the following, embodiments of a data processing apparatus and a method for processing data will be described with reference to the drawings.

1. Example of hardware configuration of data processing apparatus
2. Example of overall process by data processing apparatus
3. Application example to encryption, etc.
4. Functional configuration example of data processing apparatus A data processing apparatus is, for example, an embedded system. An embedded system is a system built in an industrial device or a household electrical appliance to implement specific functions. Note that the data processing apparatus may be a PC (Personal Computer) or the like. In the following, examples will be described in which the data processing apparatus is an embedded system based on the drawings.

<<1. Example of Hardware Configuration of Data Processing Apparatus>>

Figure 1:
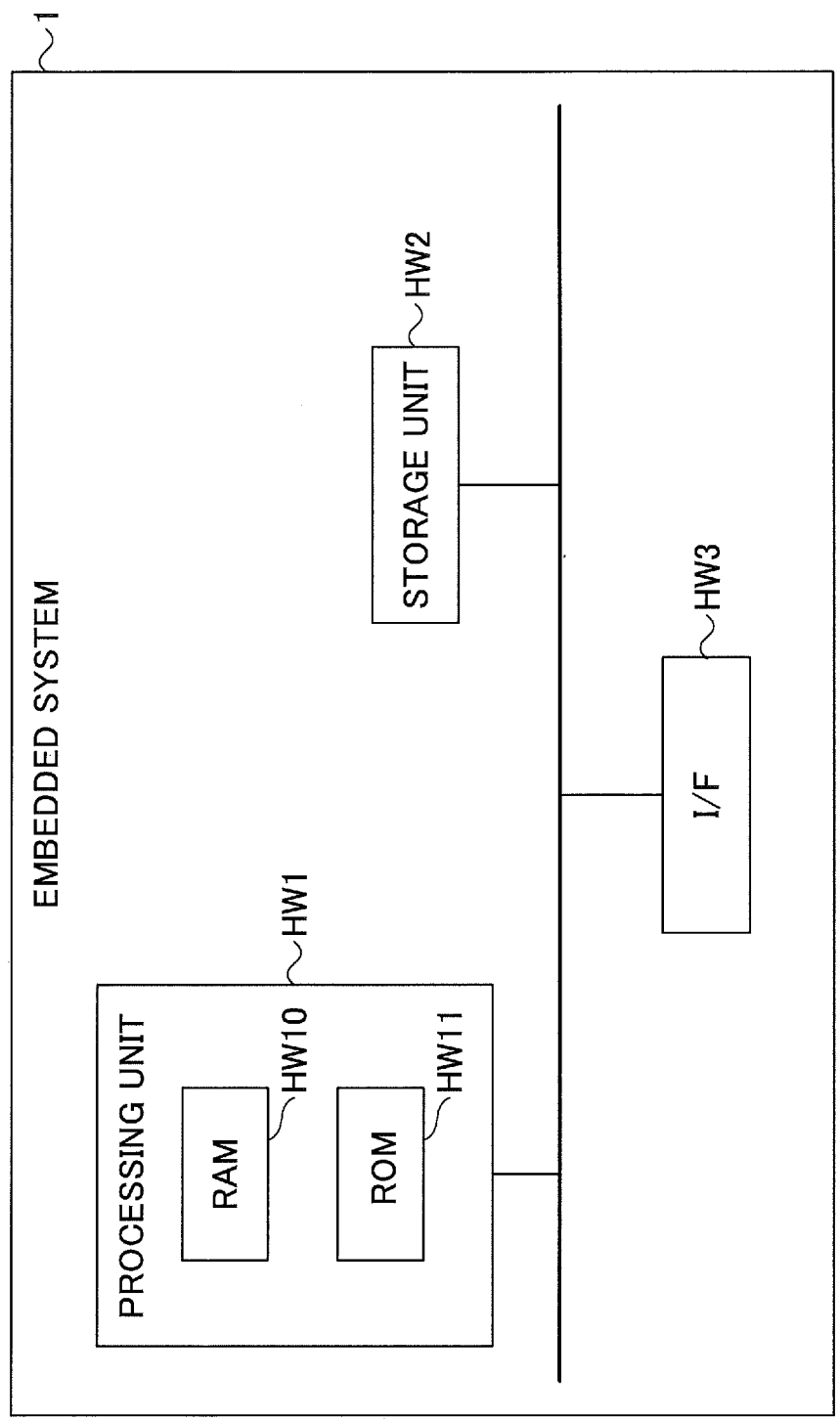
FIG. 1 is a block diagram illustrating an example of a hardware configuration of an embedded system according to an embodiment.

FIG. 1 is a block diagram illustrating an example of a hardware configuration of an embedded system according to an embodiment. As illustrated in the figure, the embedded system 1 includes a processing unit HW1, a storage unit HW2, and an I/F (interface) HW3.

The processing unit HW1 is a CPU (Central Processing Unit), an MPU (Micro Processing Unit), or the like. Also, the processing unit HW1 serves as a controller that controls the hardware included in the processing unit and the embedded system 1 that executes operations and data processing to implement all or a part of processes executed by the embedded system 1. Furthermore, for example, as illustrated in the figure, the processing unit HW1 has storage units such as a RAM (Random Access Memory) HW10 and a ROM (Read-Only Memory) HW11 built in, and these storage units implement the storage area.

The RAM HW10 is a storage unit used for loading and storing programs, set values, data, and the like used by the processing unit HW1.

The ROM HW11 is a storage unit used for storing programs, set values, data, and the like used by the processing unit HW1.

The storage unit HW2 is what is called a memory or the like. Also, the storage unit HW2 is the main memory unit that stores programs, set values, data, and the like used by the embedded system 1. Note that the storage unit HW2 may include an auxiliary storage unit.

The I/F HW3 is an interface that outputs and inputs data and the like on the embedded system 1 to transmit and receive with an external device (not illustrated). The I/F HW3 is implemented by a bus, a connector, a cable, a driver, and the like.

Note that the hardware configuration of the embedded system 1 is not limited to the illustrated configuration. For example, the embedded system 1 may not include the storage unit HW2. Also, the embedded system 1 may have auxiliary units such as another processing unit externally or internally.

<<2. Example of Overall Process by Data Processing Apparatus>>

Figure 2:
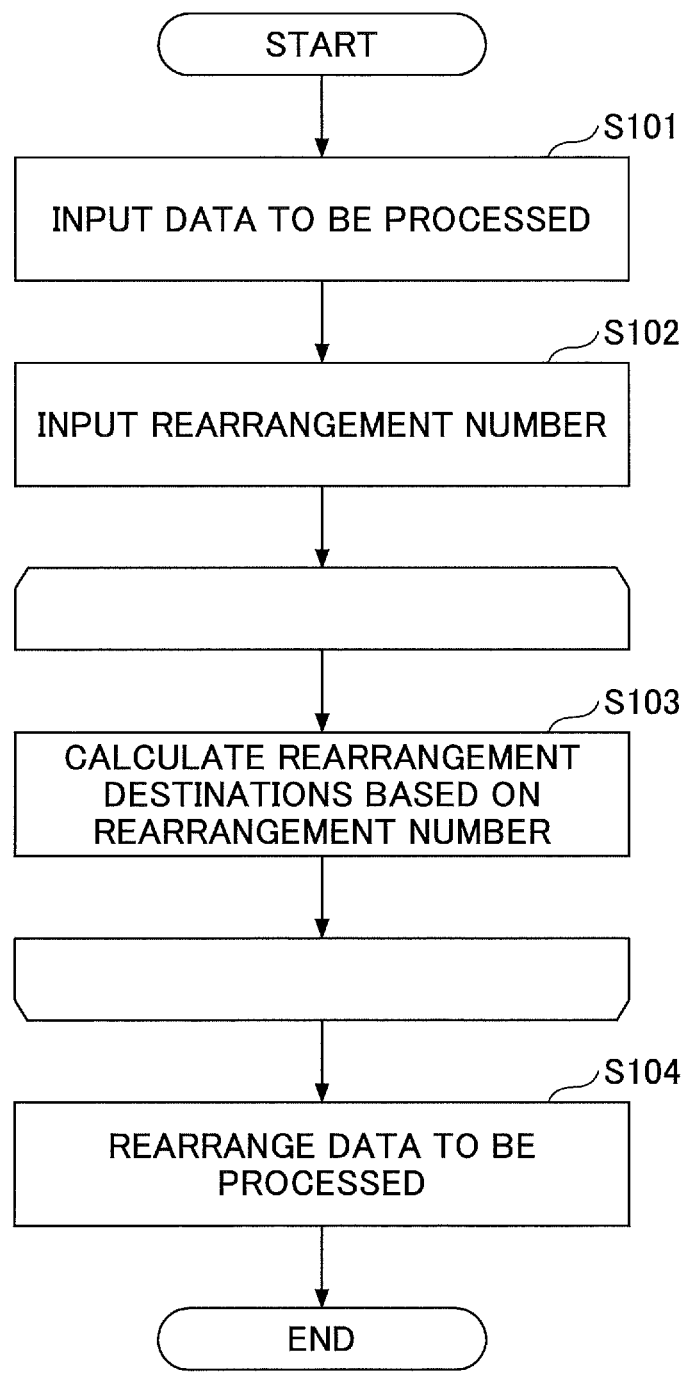
FIG. 2 is a flowchart illustrating an example of an overall process executed by an embedded system according to an embodiment.

FIG. 2 is a flowchart illustrating an example of an overall process executed by the embedded system 1 according to an embodiment. For example, the embedded system 1 executes the following processes to implement a method for processing data.

<<Example of Inputting Objective Data (Step S101)>>

At Step S101, the embedded system receives input data to be rearranged (referred to as "objective data", below). For example, the objective data includes multiple items of data as follows.

FIG. 3 is a schematic view illustrating an example of objective data according to an embodiment. For example, suppose that objective data DT as illustrated in the figure is to be rearranged. In this example, the objective data DT is constituted with four items of data, namely, the zeroth data representing "0" (referred to as the "the zeroth data DN0", below); the first data representing "1" (referred to as the "the first data DN1", below); the second representing "2" (referred to as the "the second data DN2", below); and the third data representing "3" (referred to as the "the third data DN3", below). Also, as illustrated in the figure, this example has a data configuration in which the zeroth data DN0 to the third data DN3 are arranged in ascending order. In the following, the sequence is counted from the left to the right in the figures.

Furthermore, in the following description, "N" represents the number of multiple data items that constitute the objective data DT. For example, in the illustrated example, the number is "N=4". Note that the number of data items is not limited to four (N=4), but may another number. Note that the number of data items is a value set in advance.

For example, the illustrated objective data DT, namely, the objective data of "N=4", can be converted into one of "N!(factorial)=4!=4×3×2×1=24" patterns of rearrangement. In the following description, "$n_c$" represents a position to which a data item is to be rearranged (referred to as the "rearrangement destination", below). Note that the subscript "c" of "$n_c$" is a value representing the sequence number of each data item. In other words, "c=0" represents the zeroth item.

In addition, in the following description, the rearrangement destinations of the data items are determined sequentially starting from the zeroth rearrangement destination "$n_0$". Specifically, the zeroth rearrangement destination "$n_0$" is first determined. Then, next to the zeroth rearrangement destination "$n_0$", the first rearrangement destination "$n_1$" is determined. Further, next to the first rearrangement destination "$n_1$", the second rearrangement destination "$n_2$" is determined. Finally, the third data item is a data item whose position is determined at the remaining position once the positions of the zeroth to second items have been determined. For example, in the objective data DT illustrated in FIG. 3, the rearrangement destination "$n_c$" of each data item can be represented as follows.

FIGS. 4A-4B are schematic views illustrating an example of rearrangement destinations according to an embodiment. For example, as illustrated in FIG. 4A, there are four patterns for "$n_0$", namely, "$n_0=0$" to "$n_0=3$", including a case where the zeroth data DN0 is not moved (designated by "$n_0=0$" in the figure). Specifically, "$n_0=0$" designates a pattern in which the zeroth data DN0 is rearranged with the zeroth item counted from the zeroth data DN0 (which is the zeroth data DN0 itself in the figure), namely, no movement. Also, "$n_0=1$" designates a pattern in which the zeroth data DN0 is rearranged with the first item counted from the zeroth data DN0 (which is the first data DN1 in the figure). Similarly, "$n_0=2$" designates a pattern in which the zeroth data DN0 is rearranged with the second item counted from the zeroth data DN0 (which is the second data DN2 in the figure). Further, "$n_0=3$" designates a pattern in which the zeroth data DN0 is rearranged with the third item counted from the zeroth data DN0 (which is the third data DN3 in the figure).

Then, among "$n_0=0$" to "$n_0=3$" illustrated in FIG. 4A, once the zeroth rearrangement destination "$n_0$" has been determined to be one of the patterns, then, the embedded system determines the first rearrangement destination "$n_1$" among "$n_1=0$" to "$n_1=2$" illustrated in FIG. 4B. Note that FIG. 4B is an example in which the first rearrangement destination "$n_1$" is determined after the pattern "$n_0=0$" has been determined.

In the pattern of "$n_0=0$", the zeroth data DN0 has been determined to be rearranged to the zeroth position. Therefore, three remaining positions rightward from the first position are possible patterns for the first data DN1. Specifically, as illustrated in FIG. 4B, there are three patterns for "$n_1$", namely, "$n_1=0$" to "$n_1=2$", including a case where the first data DN1 is not moved (which is "$n_1=0$" in the figure). Specifically, "$n_1=0$" designates a pattern in which the first data DN1 is rearranged with the zeroth item counted from the first data DN1 (which is the first data DN1 itself in the figure), namely, no movement. Similarly, "$n_1=1$" designates a pattern in which the first data DN1 is rearranged with the first item counted from the first data DN1 (which is the second data DN2 in the figure). Similarly, "$n_1=2$" designates a pattern in which the first data DN1 is rearranged with the second item counted from the first data DN1 (which is the third data DN3 in the figure).

Once the zeroth rearrangement destination "$n_0$" and the first rearrangement destination "$n_1$" have been determined, the embedded system determines the second rearrangement destination "$n_2$" similarly to the zeroth rearrangement destination "$n_0$" and the first rearrangement destination "$n_1$". Specifically, since the positions of the zeroth data DN0 and the first data DN1 have been determined, the embedded system determines the second rearrangement destination "$n_2$" among the remaining two. Therefore, two patterns are possible for the second rearrangement destination "$n_2$". For example, if "$n_0=0$" and "$n_1=0$" have been determined, the second rearrangement destination "$n_2$" is either "$n_2=0$" or "$n_2=1$".

Similarly, once the zeroth rearrangement destination "$n_0$" to the second rearrangement destination "$n_2$" have been determined, the embedded system determines the third rearrangement destination "$n_3$" similarly to the zeroth rearrangement destination "$n_0$" to the second rearrangement destination "$n_2$". Specifically, since the positions of the zeroth data DN0 to the second data DN2 have been determined, the third rearrangement destination "$n_3$" is the remaining one. Therefore, only one pattern is available for the third rearrangement destination "$n_3$". For example, if "$n_0=0$", "$n_1=0$", and "$n_2=0$" have been determined, the third rearrangement destination "$n_3$" is set to "$n_3=0$". In this way, once "$n_0$", "$n_1$", and "$n_2$" have been determined, only one pattern is available, and hence, the third rearrangement destination "$n_3$" is determined at the one remaining position. Therefore, in the following description, methods will be described for determining the zeroth rearrangement destination "$n_0$" to the second rearrangement destination "$n_2$", and determination of the third rearrangement destination "$n_3$" will be omitted.

The rearrangement destinations determined in this way determine the positions of the date items, and hence, determine the rearrangement pattern. In other words, in the case of "N=4", the rearrangement pattern is determined to be one of the 24 patterns. The number to identify this rearrangement pattern will be referred to as the "rearrangement number n" in the following description. In other words, in the case of "N=4", the rearrangement number n is a number among "0" to "23". For example, in the case of "N=4", the rearrangement number n is represented by the following Formula (1).

$$n=[\{(n_2 \times 3)+n_1\} \times 4]+n_0 \quad (1)$$

As represented by Formula (1), the rearrangement number n is data configured as follows.

Figure 5:
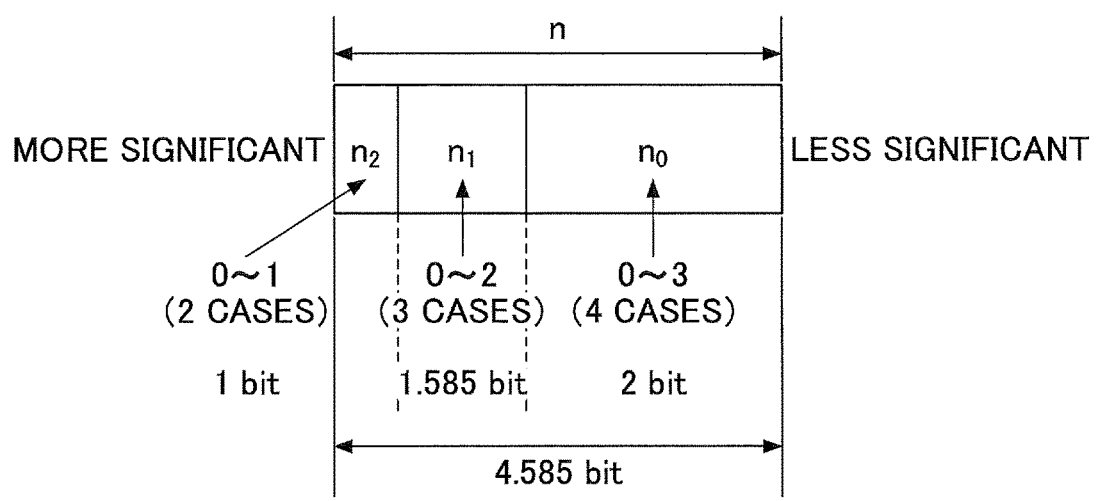
FIG. 5 is a schematic view illustrating an example of a data configuration of a rearrangement number according to an embodiment.

FIG. 5 is a schematic view illustrating an example of the data configuration of the rearrangement number according to an embodiment. As illustrated in the figure, in the case of "N=4", the rearrangement number n is constituted with three rearrangement destinations, "$n_0$", "$n_1$", and "$n_2$".

As described above, there are four patterns for "$n_0$", namely, "$n_0=0$" to "$n_0=3$". Therefore, in order to represent four patterns, the number of bits for "$n_0$" is 2 bits because $\log_2 4=2$. Similarly, there are three patterns for "$n_1$", namely, "$n_1=0$" to "$n_1=2$". Therefore, in order to represent three patterns, the number of bits for "$n_1$" is 1.585 bits because $\log_2 3=1.58496\ldots \approx 1.585$. Furthermore, there are two patterns for "$n_2$", namely, "$n_2=0$" and "$n_2=1$". Therefore, in order to represent two patterns, the number of bits for "$n_2$" is 1 bit because $\log_2 2=1$. Therefore, in the case of "N=4", the number of the bits for the rearrangement number n is "2+1.585+1=4.585 bit". Note that this value corresponds to "$\log_2 4!=\log_2 24=4.585$ bits. In other words, in the case of "N=4", the rearrangement number n is data whose rearrangement patterns can be represented by "4.585 bits".

Thus, the rearrangement number n is constituted with rearrangement destinations of respective data items. In other words, in the illustrated example, the rearrangement number n has constituents of "$n_0$", "$n_1$", and "$n_2$", and the number of the constituents is "N−1". As illustrated in the figure, the data volume of the rearrangement destinations can be quantified by the number of bits with which the number of patterns of rearrangement destinations can be represented because the rearrangement destinations represent rearrangement destinations of respective data items.

Once having received as input the rearrangement number n represented by Formula (1), the embedded system can calculate the rearrangement destinations "$n_0$" to "$n_3$" from the rearrangement number n, for example, by the following process.

<<Example of Inputting Rearrangement Number (Step S102)>>

Referring back to FIG. 2, at Step S102, the embedded system receives the rearrangement number n as input. For example, the user determines the rearrangement pattern and inputs the rearrangement number n into the embedded system by a user operation or the like.

<<Example of Calculating Rearrangement Destinations Based on Rearrangement Number (Step S103)>>

At Step S103, the embedded system calculates the rearrangement destinations based on the rearrangement number n. For example, in the case of "N=4", the embedded system calculates the zeroth rearrangement destination "$n_0$" to the second rearrangement destination "$n_2$" from the rearrangement number n, based on the following Formulas (2) to (4), respectively.

$$n_0 = n \bmod 4 \quad (2)$$

As represented by Formula (2), the zeroth rearrangement destination "$n_0$" is the remainder of dividing the rearrangement number n by "4". As illustrated in FIG. 5, the zeroth rearrangement destination "$n_0$" is a constituent that represents "four cases" in the rearrangement number n. Therefore, by extracting the constituent corresponding to the "four cases" in the rearrangement number n, namely, calculating the remainder of dividing the rearrangement number n by "4", the zeroth rearrangement destination "$n_0$" is calculated. Next, the first rearrangement destination "$n_1$" is calculated by the following Formula (3).

$$n_1 = (n \div 4) \bmod 3 \qquad (3)$$

As represented by Formula (3), the embedded system first divides the rearrangement number n by "4". As illustrated in FIG. 5, the "four cases" in the rearrangement number n correspond to the data that represents the zeroth rearrangement destination "$n_0$". Therefore, the embedded system executes the division to remove the "four cases" in the rearrangement number n. Then, since "three cases" are possible for the first rearrangement destination "$n_1$", by further dividing the division result by "3" to obtain the remainder, the first rearrangement destination "$n_1$" can be calculated. Next, the second rearrangement destination "$n_2$" is calculated by the following Formula (4).

$$n_2 = \{n \div (4 \times 3)\} \bmod 2 \qquad (4)$$

As represented by Formula (4), the embedded system first divides the rearrangement number n by "4×3". In the rearrangement numbers n, "4×3=12" cases obtained by multiplying the "four cases" of the zeroth rearrangement destinations "$n_0$" by the "three cases" of the first rearrangement destinations "$n_1$" represent the constituents corresponding to the zeroth rearrangement destination "$n_0$" and the first rearrangement destination "$n_1$". Therefore, the embedded system executes the division to remove "4×3=12" cases in the rearrangement numbers n. Then, since there are two cases of the second rearrangement destination "$n_2$", by further dividing the division result by "2" to obtain the remainder, the calculation completes.

Based on Formula (2) to Formula (4), the embedded system repeatedly calculates the rearrangement destinations, namely, "$n_0$" to "$n_2$".

<<Example of Rearrangement of Objective Data (Step S104)>>

Referring back to FIG. 2, at Step S104, the embedded system rearranges the objective data. In other words, based on "$n_0$" to "$n_2$" that can be calculated by repeating Step S103, the embedded system rearranges the objective data.

After the process as illustrated in FIG. 2 has been executed, the objective data is rearranged, for example, as follows.

First, at Step S102 illustrated in FIG. 2, "18" is input into the embedded system as the rearrangement number n. Next, "$n_0$" to "$n_2$" are calculated at Step S103 illustrated in FIG. 2, respectively. Specifically, "$n_0$" is calculated as in the following Formula (5) based on Formula (2).

$$n_0 = 18 \bmod 4 = 2 \qquad (5)$$

As represented by Formula (5), "$n_0 = 2$" is calculated by the embedded system dividing the rearrangement number n "18" by "4".

Next, "$n_1$" is calculated as in the following Formula (6) based on Formula (3).

$$n_1 = (18 \div 4) \bmod 3 = 1 \qquad (6)$$

As represented by Formula (6), the embedded system first executes calculation of dividing the rearrangement number n "18" by "4". Note that the division result is set to "4", which is the integer part of "18/4=4.5". Then, the embedded system further divides the division result "4" by "3", to calculate "$n_1 = 1$".

Next, "$n_2$" is calculated as in the following Formula (7) based on Formula (4).

$$n_2 = \{18 \div (4 \times 3)\} \bmod 2 = 1 \qquad (7)$$

As represented by Formula (7), the embedded system first executes calculation of dividing the rearrangement number n "18" by "4×3". Note that the division result is set to "1", which is the integer part of "18/12=1.5". Then, the embedded system further divides the division result "1" by "2", to calculate "$n_2 = 1$".

In this way, in the case of the rearrangement number n being "18", "$n_0 = 2$", "$n_1 = 1$", and "$n_2 = 1$" are calculated by Step S103 illustrated in FIG. 2, respectively. Based on the rearrangement destinations calculated based on such calculation, the following rearrangement is executed at Step S104 illustrated in FIG. 2.

FIGS. 6A-6D are diagrams illustrating an example of a process result of an overall process executed by a data processing apparatus according to an embodiment in the present disclosure. In the following, the example will be described in which the objective data DT illustrated in FIG. 3 has been input and the rearrangement number n is "18".

Figure 6A:
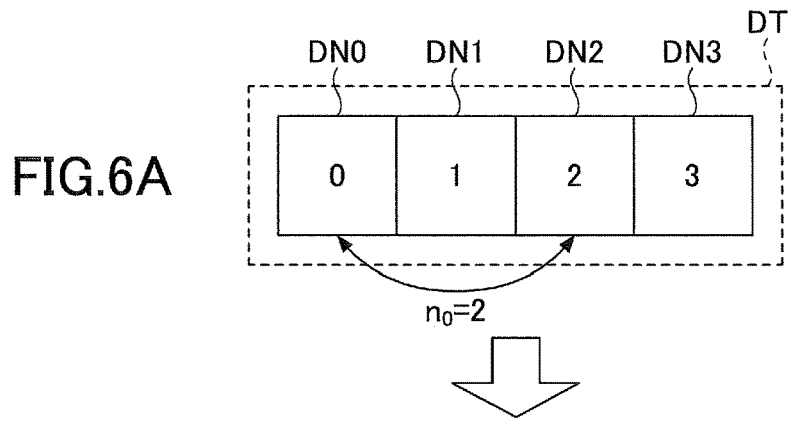
FIGS. 6A-6D are diagrams illustrating an example of a process result of an overall process executed by a data processing apparatus according to an embodiment in the present disclosure.

First, for the objective data DT as illustrated in FIG. 6A, based on "$n_0 = 2$", the zeroth data DN0 and the second data DN2, the latter of which is the second rightward item counted from the zeroth data DN0 being the zeroth item, are rearranged by the embedded system. In other words, first, the objective data DT illustrated in FIG. 6A becomes the second objective data DT2 illustrated in FIG. 6B in which the zeroth data DN0 and the second data DN2 have been rearranged by the embedded system based on the zeroth rearrangement destination "$n_0 = 2$" calculated by Formula (5).

Figure 6B:
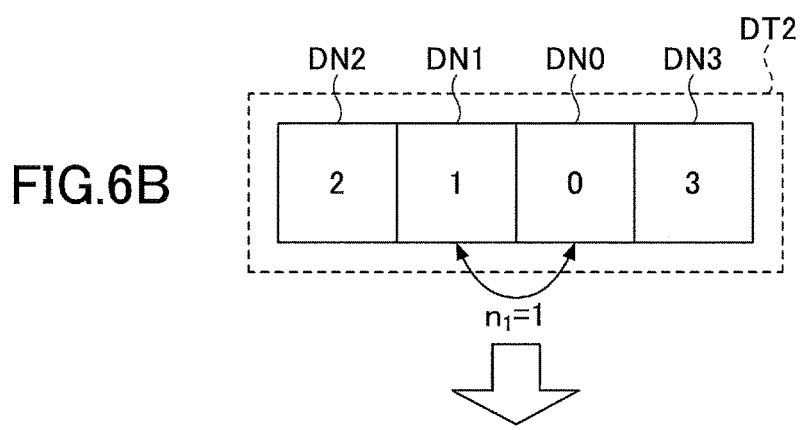

As illustrated in FIG. 6B, in the second objective data DT2, compared to the objective data DT illustrated in FIG. 6A, the positions of the zeroth data DN0 and the second data DN2 are different.

Next, for second the objective data DT2 as illustrated in FIG. 6B, based on "$n_1 = 1$", the first data DN1 and the zeroth data DN0, the latter of which is the first rightward item counted from the first data DN1 being the first data item, are rearranged by the embedded system. In other words, the second objective data DT2 illustrated in FIG. 6B becomes the third objective data DT3 illustrated in FIG. 6C in which the first data DN1 and the zeroth data DN0 have been rearranged by the embedded system based on the first rearrangement destination "$n_1 = 1$" calculated by Formula (6).

Figure 6C:
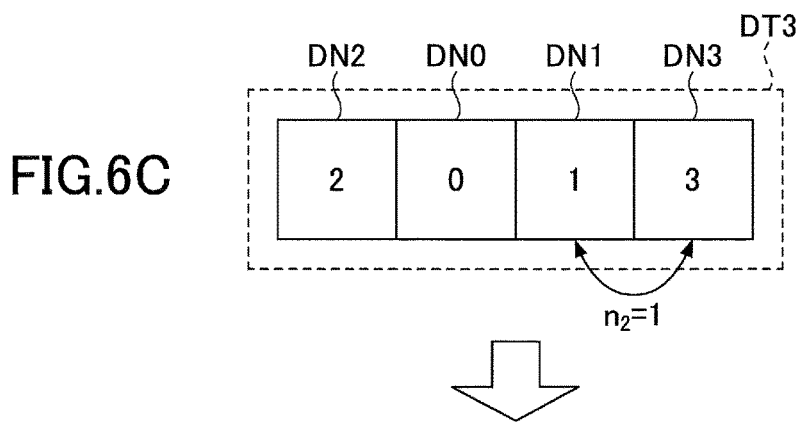

As illustrated in FIG. 6C, in the third objective data DT3, compared to the second objective data DT2 illustrated in FIG. 6B, the positions of the zeroth data DN0 and the first data DN1 are different.

Next, for the third objective data DT3 as illustrated in FIG. 6C, based on "$n_2 = 1$", the first data DN1 and the third data DN3, the latter of which is the first rightward item counted from the first data DN1 being the second data item, are rearranged by the embedded system. In other words, the third objective data DT3 as illustrated in FIG. 6C becomes the fourth objective data DT4 illustrated in FIG. 6D in which the first data DN1 and the third data DN3 have been rearranged by the embedded system based on the second rearrangement destination "$n_2 = 1$" calculated by Formula (7).

Figure 6D:
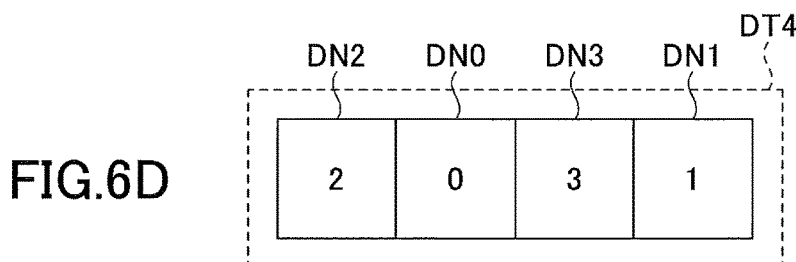

As illustrated in FIG. 6D, in the fourth objective data DT4, compared to the third objective data DT3 illustrated in FIG. 6C, the positions of the first data DN1 and the third data DN3 are different.

In this way, based on the rearrangement number n having been input, the embedded system can rearrange the data based on the respective rearrangement destinations $n_c$ calculated from the rearrangement number n, as illustrated in FIGS. 6A-6D. Specifically, in the case of "N=4" and the objective data DT illustrated in FIG. 3 having been input, the rearrangement numbers, the rearrangement destinations, and the rearrangement patterns have the following relationship.

FIG. 7 is a diagram illustrating an example of rearrangement numbers, rearrangement destinations, and rearrangement patterns in the case of "N=4" according to an embodiment in the present disclosure. As illustrated in the figure, having received as input the rearrangement number n, the embedded system can calculate the rearrangement destinations $n_c$ by Formula (2) to Formula (4). Then, once the rearrangement destinations $n_c$ have been determined, the embedded system can rearrange the data as in FIGS. 6A-6D.

Also, as illustrated in FIG. 7, once the rearrangement number n has been determined, the rearrangement pattern is determined to be one of 24 patterns. In other words, the rearrangement number n having been determined can determine which one of the rearrangement patterns is to be used for converting the data. Therefore, the embedded system may specify a table such as an LUT with which the data can be converted following the rearrangement pattern corresponding to the rearrangement number n. In this case, the embedded system can reduce the load to calculate the rearrangement destinations $n_c$.

Furthermore, the number of data items to be rearranged is not limited to four or "N=4". Taking cases other than "N=4" into consideration, namely, generalizing Formula (2) to Formula (4), the formula to calculate the rearrangement destinations "$n_c$" from the rearrangement number n is represented by the following formula (8).

$$q(0)=n$$

$$q(c+1)=q(c) \div (N-c)$$

$$n_c=q(c) \bmod (N-c) \quad (8)$$

In other words, by setting "N=4" in Formula (8), Formula (2) to Formula (4) are derived. Furthermore, by inputting "18" as the rearrangement number n, calculation can be executed as done with Formula (5) to Formula (7). Thus, once having received as input the rearrangement number n, the embedded system can rearrange the data so that the predetermined rearrangement pattern is realized. In addition, by using the rearrangement number n, the embedded system can make the data volume required for rearrangement smaller compared to a case where table data such as an LUT is used. Specifically, the data volume is quantified as follows.

FIG. 8 is a diagram illustrating an example of the data volume required for rearrangement of data according to an embodiment in the present disclosure. The figure illustrates the data volume for each number of data items "N" when using the rearrangement number n.

For example, in the case of "N=256", the data volume of the rearrangement number n is "211 bytes". On the other hand, the data volume is "256 bytes" if a table is used because the table needs one data entry for each of the 256 data items. Therefore, by using the rearrangement number n, in the case of "N=256", namely, the case of 8-bit input and the 8-bit output, the embedded system can reduce the data volume by "256−211=45 bytes" compared to the case where the table is used.

<<Example of Process for Calculating Rearrangement Number n from Rearrangement Pattern>>

Alternatively, the embedded system can calculate the rearrangement number n from a rearrangement pattern, for example, by the following process. In the following, the example will be described with the objective data DT illustrated in FIG. 3. In other words, the example will be described in which the rearrangement number n is calculated for a case of converting multiple data items sorted in ascending order as in the objective data DT into a predetermined rearrangement pattern.

Figure 9:
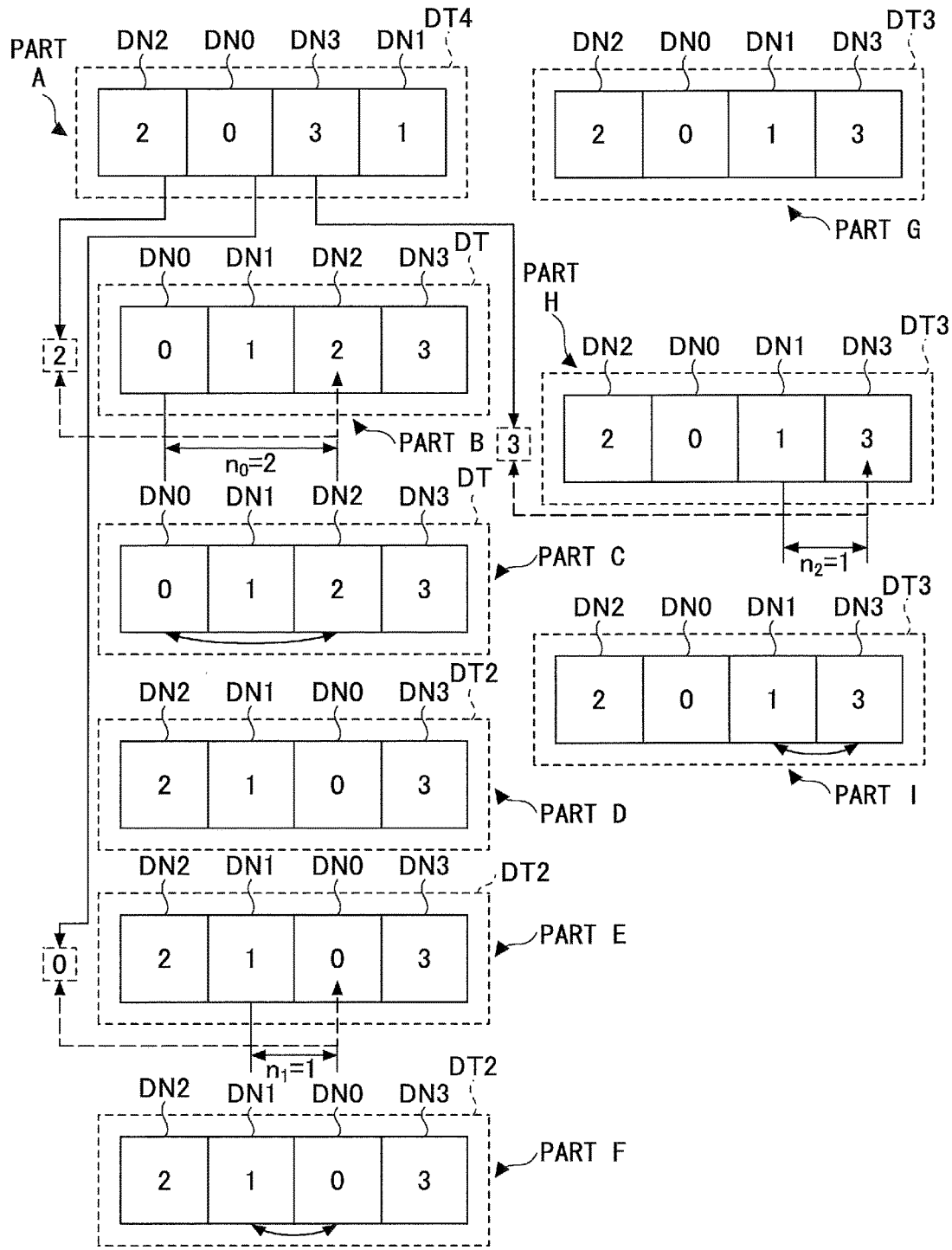
FIG. 9 is a diagram illustrating an example in which a rearrangement number is calculated from a rearrangement pattern according to an embodiment in the present disclosure.

FIG. 9 is a diagram illustrating an example in which a rearrangement number is calculated from a rearrangement pattern according to an embodiment in the present disclosure. In the following, the example will be described in which the rearrangement number n of the rearrangement pattern is calculated by which the objective data DT illustrated in FIG. 3 is converted into the fourth objective data DT4 illustrated in Part A of FIG. 9. In other words, as described with FIG. 6, the rearrangement pattern of this example corresponds to the rearrangement number n being "18". In the calculation, the embedded system calculates each rearrangement destination "$n_c$" based on patterns in the rearrangement pattern. Note that the calculation sequence starts from the left in the figure.

First, in the rearrangement pattern of the fourth objective data DT4 illustrated in Part A of FIG. 9, calculation is made for the second data DN2 positioned leftmost in the pattern. This calculation is executed, for example, as illustrated in Part B of FIG. 9. Specifically, the second data DN2 is a data item that is detected in the second position if it is searched for in the objective data DT. The position where the second data DN2 is searched for is the second rightward position counted from the zeroth position, namely, the leftmost position where the zeroth data DN0 is positioned. In this way, the distance between the position where the second data DN2 is searched for and the zeroth position is calculated as the zeroth rearrangement destination "$n_0$". In other words, in this example, as illustrated in Part B of FIG. 9, the embedded system calculates it as "$n_0=2$".

Next, as illustrated in Part C of FIG. 9, the embedded system rearranges the zeroth data DN0 and the second data DN2. Having been rearranged as illustrated in Part C of FIG. 9, the data becomes the second objective data DT2 as illustrated in Part D of FIG. 9.

Then, in the rearrangement pattern of the fourth objective data DT4 illustrated in Part A of FIG. 9, calculation is made for the zeroth data DN0 positioned as the second item from the left. This calculation is executed, for example, as illustrated in Part E of FIG. 9. Specifically, the zeroth data DN0 is a data item that is detected in the third position if it is searched for in the second objective data DT2. The position where the zeroth data DN0 is searched for is the first rightward position counted from the first position, namely, the second position from the left side in the second objective data DT2. In this way, the distance between the position where the zeroth data DN0 is searched for and the first position is calculated as the first rearrangement destination "$n_1$". In other words, in this example, as illustrated in Part E of FIG. 9, the embedded system calculates it as "$n_1=1$".

Next, as illustrated in Part F of FIG. 9, the embedded system rearranges the first data DN1 and the zeroth data DN0. Having been rearranged as illustrated in Part F of FIG. 9, the data becomes the third objective data DT3 as illustrated in Part G of FIG. 9.

Then, in the rearrangement pattern of the fourth objective data DT4 illustrated in Part A of FIG. 9, calculation is made for the third data DN3 positioned as the third item from the left. This calculation is executed, for example, as illustrated in Part H of FIG. 9. Specifically, the third data DN3 is a data item that is detected in the fourth position if it is searched for in the third objective data DT3. The position where the third data DN3 is searched for is the first rightward position counted from the second position, namely, the third position from the left side in the third objective data DT3. In this way, the distance between the position where the third data DN3 is searched for and the second position is calculated as the second rearrangement destination "$n_2$". In other words, in this example, as illustrated in Part H of FIG. 9, the embedded system calculates it as "$n_2=1$".

Next, as illustrated in Part I of FIG. 9, the embedded system rearranges the first data DN1 and the third data DN3. Having been rearranged as illustrated in Part I of FIG. 9, the data becomes the fourth objective data DT4 as illustrated in Part A of FIG. 9.

By executing the calculation as illustrated in Part B of FIG. 9, Part E of FIG. 9, and Part H of FIG. 9, the embedded system can calculate each rearrangement destination "$n_c$". In this example, the embedded system can calculate "$n_0=2$", "$n_1=1$", and "$n_2=1$". Next, having the calculated rearrangement destinations "$n_c$" substituted in Formula (1), the embedded system can execute the rearrangement number n. Specifically, Formula (1) with the substitution of "$n_0=2$", "$n_1=1$", and "$n_2=1$" is calculated as in the following Formula (9)

$$n = [\{(n_2 \times 3) + n_1\} \times 4] + n_0 \quad (9)$$
$$= [\{(1 \times 3) + 1\} \times 4] + 2$$
$$= 18$$

As represented by Formula (9), the embedded system can calculate the rearrangement number n as "18". Generalizing Formula (9) and the like, a calculation formula to calculate the rearrangement number n from a rearrangement pattern can be represented as the following Formula (10).

$$p(N-2) = n_{N-2}$$
$$p(c) = \{p(c+1) \times (N-c)\} + n_c$$
$$n = p(0) \quad (10)$$

By using Formula (10), the embedded system can calculate the rearrangement number n from a rearrangement pattern for cases other than "N=4".

<<Another Example of Overall Process>>

For example, suppose that the data items illustrated in FIG. 3 are input. Note that in the following description, the input sequence of the data items is counted from "0", and represented by "c". For example, based on the rearrangement number n, data is selected as follows.

Figure 10:
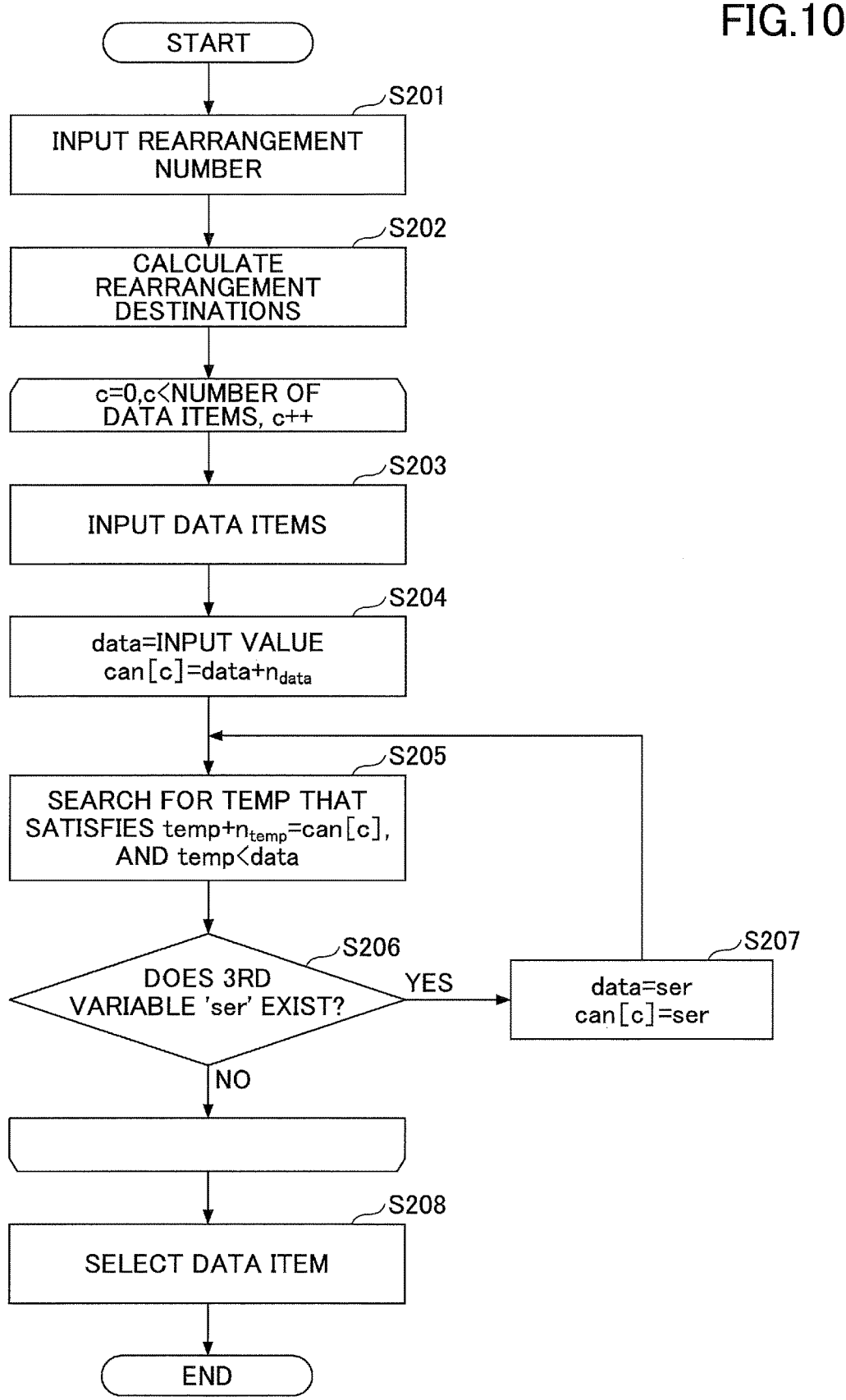
FIG. 10 is a flowchart illustrating another example of an overall process executed by an embedded system according to an embodiment.

FIG. 10 is a flowchart illustrating another example of an overall process executed by an embedded system according to an embodiment.

<<Example of Inputting Rearrangement Number (Step S201)>>

At Step S201, the embedded system receives as input the rearrangement number n. For example, the embedded system receives as input the rearrangement number n in the same way as done at Step S102 illustrated in FIG. 2.

<<Example of Calculating Rearrangement Destinations (Step S202)>>

At Step S202, the embedded system calculates rearrangement destinations "$n_c$". Specifically, based on the rearrangement number n input at Step S201, the embedded system calculates respective rearrangement destinations "$n_c$". In other words, the rearrangement destinations "$n_c$" are calculated for "$n_0$" to "$n_{(number\ of\ data\ items)-1}$". For example, the embedded system calculates the rearrangement destinations "$n_c$" from the rearrangement number n, based on Formula (8). In the following, an example will be described in which "$n_0=2$", "$n_1=1$", "$n_2=3$", and "$n_3=2$", based on the rearrangement number n.

<<Example of Processing Zeroth Data (c=0)>>
<<Example of Inputting Data Items (Step S203)>>

At Step S203, the embedded system receives as input data items. In this example, the embedded system first receives as input the zeroth data (c=0). Note that in this example, the zeroth data is assumed to have the input value of "0".

<<Example of Substituting Input Value and Calculating Candidate Value (Step S204)>>

At Step S204, the embedded system substitutes the input value and calculates the candidate value. First, at Step S204, the embedded system substitutes the input value for a first variable "data". In the case of the zeroth data (c=0), the input value is "0", and hence, the substitution makes "data=0".

Next, at Step S204, the embedded system calculates a candidate value. The candidate value is calculated as "can[c]=data+$n_{data}$". Specifically, in the case of the zeroth data, "data=0" and "$n_{data}=n_0$". In addition, "$n_0$" is set to "$n_0=2$" at Step S202. Therefore, in the case of the zeroth data, the embedded system calculates "can[0]=0+2=2".

<<Example of Search (Step S205)>>

At Step S205, the embedded system searches for a second variable "temp". Specifically, at Step S205, the embedded system searches for whether a second variable "temp" exists that satisfies "temp+$n_{temp}$=can[c]" and "temp<data". If there is a second variable "temp" that satisfies the above conditions, the corresponding value is set to a third variable "ser". Note that if multiple corresponding values exist, the maximum value is set to the third variable "ser".

<<Example of Determining Whether Third Variable Exists (Step S206)>>

At Step S206, the embedded system determines whether a third variable exists. In other words, if having determined at Step S205 that the second variable "temp" satisfying the conditions exists and the third variable "ser" exists (YES at Step S206), the embedded system proceeds to Step S207. On the other hand, if having determined at Step S205 that no second variable "temp" satisfying the conditions exists and no third variable "ser" exists (NO at Step S206), the embedded system proceeds to Step S203 (if the loop is to be repeated), or Step S208 (if the loop ends).

In the case of the zeroth data (c=0), the candidate value is set to "can[0]=2" (Step S204), the first variable is set to "data=0" (Step S204), and "$n_{data}=n_0=2$" (Step S202). Therefore, this is a case where the second variable "temp" satisfying the conditions of "temp+$n_{temp}$=can[c]" and "temp<data" does not exist (NO at Step S206 NO). In this case, based on the loop, the embedded system then proceeds to processing the first data (c=1) (Step S203).

Therefore, in the zeroth data (c=0), the candidate value "can[0]=2" turns out to be the solution.

<<Example of Processing First Data (c=1)>>

In the case of the first data (c=1), the embedded system executes the following process by Step S203 to Step S207. In this example, the first data is assumed to have the input value of "1".

Therefore, the embedded system sets "data=1" (Step S204). Furthermore, the embedded system calculates "can[1]=data+$n_{data}$=1+$n_1$=1+1=2" (Step S204).

Next, the embedded system searches for whether the second variable "temp" satisfying "temp+$n_{temp}$=can[c]" and "temp<data" exists (Step S205), and finds "temp=0" (YES at Step S206).

Then, at Step S207, the embedded system sets "data=ser=0" and further sets "can[1]=ser=0". Then, under the conditions of "data=0" and "can[1]=0", the embedded system searches for whether the second variable "temp" satisfying "temp+$n_{temp}$=can[c]" and "temp<data" exists (Step S205), and this search results in a case where the second variable "temp" that satisfies the conditions does not exist (NO at Step S206). In this case, based on the loop, the embedded system then proceeds to processing the second data (c=2) (Step S203).

Therefore, in the first data (c=1), the candidate value "can[1]=0" turns out to be the solution.

<<Example of Processing Second Data (c=2)>>

In the case of the second data (c=2), the embedded system executes the following process by Step S203 to Step S207. In this example, the second data is assumed to have the input value of "2".

Therefore, the embedded system sets "data=2" (Step S204). Furthermore, the embedded system calculates "can[2]=data+$n_{data}$=2+$n_2$=2+3=5" (Step S204).

Next, the embedded system searches for whether the second variable "temp" satisfying "temp+$n_{temp}$=can[c]" and "temp<data" exists (Step S205), and this search results in a case where the second variable "temp" that satisfies the conditions does not exist (NO at Step S206). In this case, based on the loop, the embedded system then proceeds to processing the third data (c=3) (Step S203).

Therefore, in the second data (c=2), the candidate value "can[2]=5" turns out to be the solution.

<<Example of Processing Third Data (c=3)>>

In the case of the third data (c=3), the embedded system executes the following processes by Step S203 to Step S207. In this example, the third data is assumed to have the input value of "3".

Therefore, the embedded system sets "data=3" (Step S204). Furthermore, the embedded system calculates "can[3]=data+$n_{data}$=3+$n_3$=3+2=5" (Step S204).

Next, the embedded system searches for whether the second variable "temp" satisfying "temp+$n_{temp}$=can[c]" and "temp<data" exists (Step S205), and finds "temp=2" (YES at Step S206).

Then, at Step S207, the embedded system sets "data=ser=2" and further sets "can[3]=ser=2". Then, under the conditions of "data=2" and "can[3]=2", the embedded system searches for whether the second variable "temp" satisfying "temp+$n_{temp}$=can[c]" and "temp<data" exists (Step S205), and finds "temp=1" (YES at Step S206).

Then, at Step S207, the embedded system sets to "data=ser=1" and further sets "can[3]=ser=1". Then, under the conditions of "data=1" and "can[3]=1", the embedded system searches for whether the second variable "temp" satisfying "temp+$n_{temp}$=can[c]" and "temp<data" exists (Step S205), and this search results in a case where the second variable "temp" that satisfies the conditions does not exist (NO at Step S206). In this case, the embedded system proceeds to Step S208.

Therefore, in the third data (c=3), the candidate value "can[3]=1" turns out to be the solution.

<<Example of Selecting Data (Step S208)>>

At Step S208, the embedded system selects data items based on the candidate values "can[0]" to "can[3]". The process result is obtained, for example, as follows.

Figure 11:
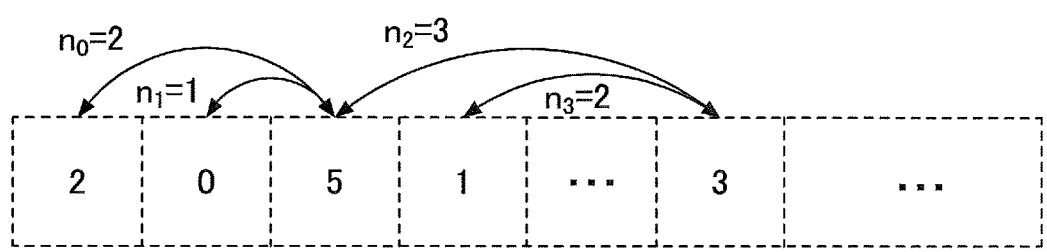
FIG. 11 is a schematic view illustrating an example of a processed result of the other overall process by the embedded system according to an embodiment in the present disclosure.

FIG. 11 is a schematic view illustrating an example of a processed result of the other overall process by the embedded system according to the embodiment in the present disclosure. As illustrated in the figure, the embedded system can look up an input data item based on the rearrangement number n. In other words, by selecting the data items based on the rearrangement number n, the embedded system can generate a table as illustrated without generating a look-up table.

<<3. Example of Application to Encryption Etc.>>

The processes illustrated in FIG. 2 and the like are applicable to, for example, AES (Advanced Encryption Standard) based encryption and the like. Specifically, the processes illustrated in FIG. 2 and the like are applicable to, for example, a process of the white-box cryptography by AES and the like as follows.

Figure 12:
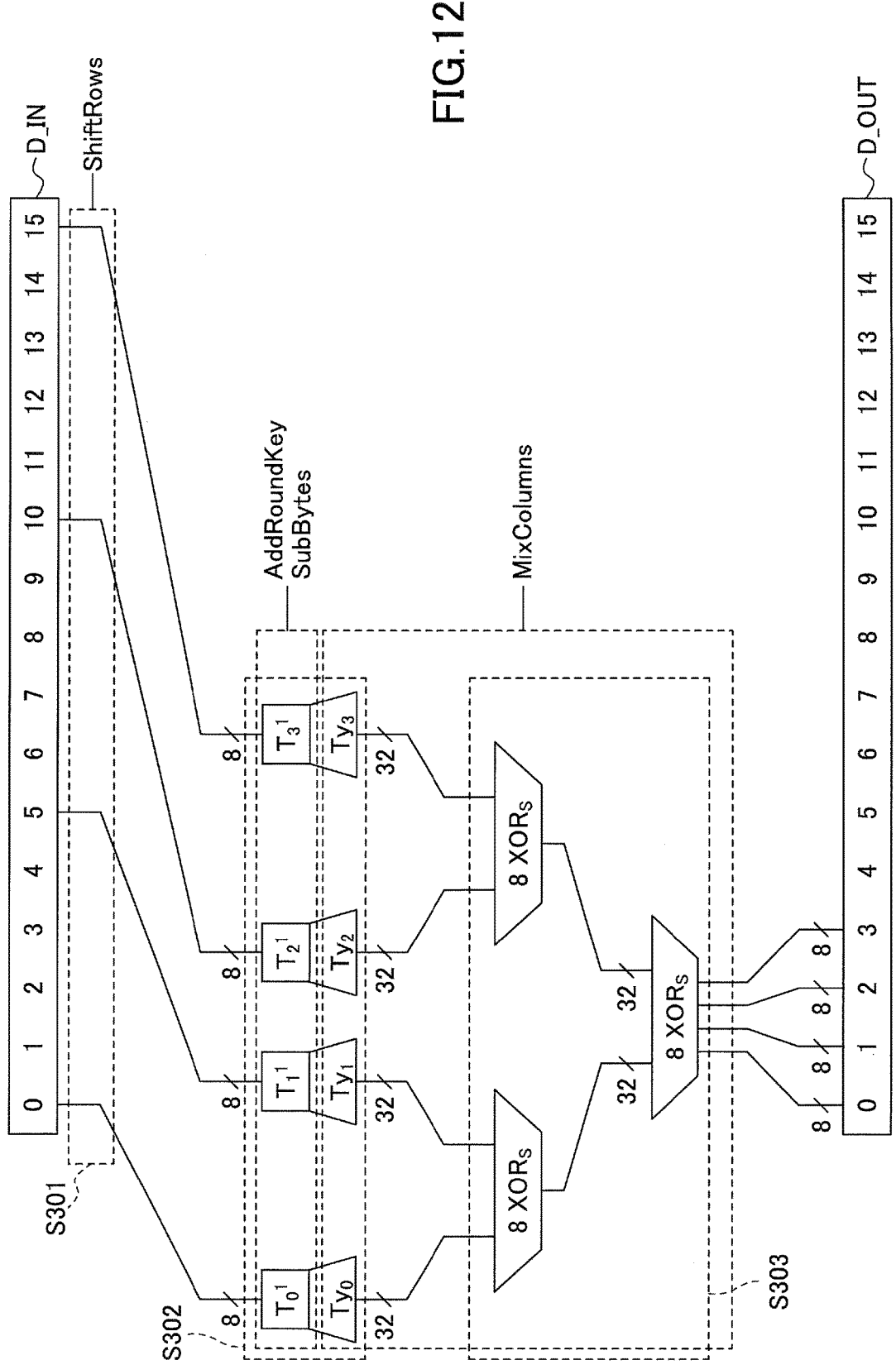
FIG. 12 is a schematic view illustrating an example in which rearrangement according to an embodiment in the present disclosure is applied to a process per round for encryption.

FIG. 12 is a schematic view illustrating an example in which rearrangement according to an embodiment in the present disclosure is applied to a process per round for encryption. The illustrated process is an example of a process per sub-round in which four items of one-byte data among input data DIN are processed to generate four items of one-byte data among output data DOUT. Also, four sub-round process is repeated in the illustrated process or the process per round. In the following, the process per sub-round will be mainly described.

At Step S301, four items of one-byte data are selected. Also, the process result obtained by executing Step S301 is the same as a process result obtained by executing "Shift-Rows" function specified in FIPS 197.

At Step S302, the one-byte data items selected at Step S301 are transformed by what is called a T-Box transformation or the like, and the transformed data items are output.

At Step S303, a transformation is applied based on tables such as what is called XOR-Tables to the data items output at Step S302, and as illustrated in the figure, the same process result is output as in the case where exclusive OR is calculated.

As illustrated in the figure, the process result obtained by executing Step S302 and Step S303 is the same as a process result obtained by executing "AddRoundKey" function, "SubBytes" function, and "MixColumns" function specified in FIPS 197.

The embedded system can apply the processes illustrated in FIG. 2 and the like to a part of the process of "$T^1$" and the like among the illustrated processes. Specifically, in the part of the process of "$T^1$", a rearrangement process is executed. Thereupon, the embedded system first stores the rearrangement number n in the RAM HW10 (see FIG. 1) or the like in advance. Then, for the rearrangement, the embedded system can execute the overall process based on the rearrangement number n as illustrated in FIG. 2 and the like to implement the rearrangement. In addition, the embedded system may execute rearrangement in encryption by specifying a table from the rearrangement number n. Note that in decryption using inverse functions, the embedded system may execute rearrangement similarly. Otherwise, encryption may be processed as follows.

Figure 13:
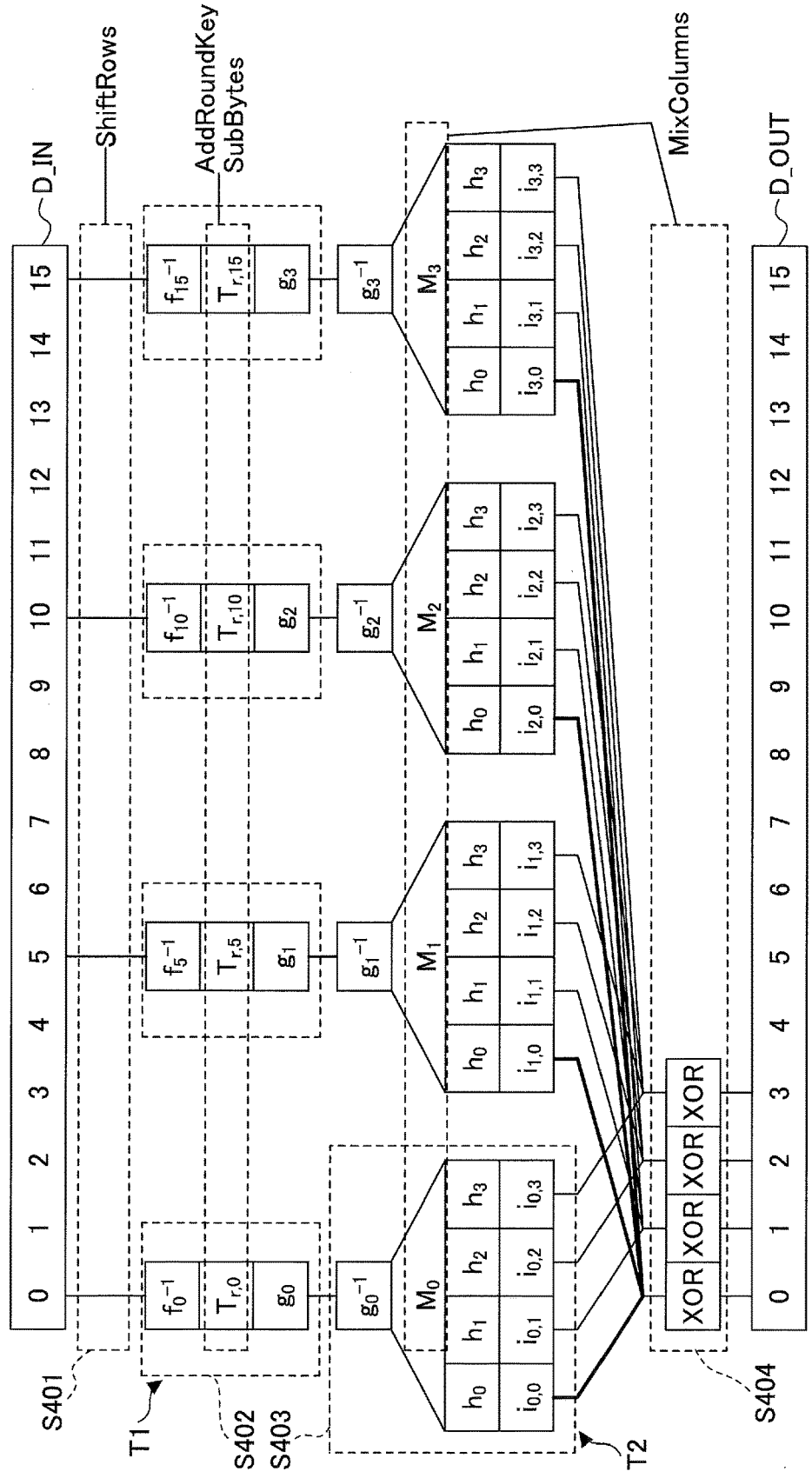
FIG. 13 is a schematic view illustrating another example in which rearrangement according to an embodiment in the present disclosure is applied to a process per round for encryption.

FIG. 13 is a schematic view illustrating another example in which rearrangement according to an embodiment in the present disclosure is applied to a process per round for encryption. Specifically, the process per round may be applied to encryption disclosed in Japanese Patent Application No. 2015-165174. More specifically, it is a process for input data D_IN into which 16 one-byte data items of "0" to "15" illustrated in FIG. 13 have been input. Furthermore, in the process per round, the process for the unit of four-byte data selected among the 16 bytes is repeated, namely, the process per sub-round is repeated. In other words, in the process per round, the process per sub-round is repeated for four sub-rounds. In the following, the process for one sub-round will be mainly described.

<<Example of Selecting Sub-Round Data (Step S401)>>

At Step S401, the embedded system selects sub-round data. In other words, the embedded system selects sub-round data to be processed in the one sub-round among the input data D_IN. Also, the process result obtained by executing Step S401 is the same as a process result obtained by executing "ShiftRows" function specified in FIPS 197.

In the following, as illustrated in FIG. 13, the process will be described with the example in which at Step S401, one-byte data items of "0", "5", "10", and "15" are selected as the sub-round data among the input data D_IN. Among the selected sub-round data items, a process for the one-byte data item of "0" will be described as an example.

<<Example of Replacement Based on Table (Step S402)>>

At Step S402, the embedded system executes replacement based on a table. In other words, as illustrated in the figure, the embedded system replaces the one-byte data of "0" having been input, based on the table. Then, once the replacement has been executed based on the table, replacement data is generated. In addition, the replacement based on the table includes a first transformation "g" and a second inverse transformation "$f^{-1}$"

<<Example of Rearranging Bits Based on Table (Step S403)>>

At Step S403, the embedded system rearranges bits based on a table. In the figure, the rearrangement is represented by "h". Note that "i" represents addition or the like by exclusive OR with a random number.

<<Example of Calculating Exclusive OR (Step S404)>>

At Step S404, the embedded system calculates exclusive OR.

In addition, the replacement based on the table and the calculation of exclusive OR include a second conversion "f".

As done for the one-byte data of "0", once Step S401 to Step S404 have been executed for the other one-byte data items of "5", "10", and "15" among the input data D_IN, data items of "0" to "3" are generated among the output data D_OUT, and thus, the process for the one sub-round is completed.

For example, the processes illustrated in FIG. 2 and the like are applicable to the process of "T2" in the illustrated encryption. Note that in the process per byte for outputting four bytes with respect to one-byte input by "T2", it is often the case that a 256-byte table is required for transformation of the one byte. Thereupon, the processes illustrated in FIG. 2 and the like can be adopted to utilize the rearrangement number of 211 bytes instead of the table. Configured as such, it is possible to reduce the data volume from 256 bytes per table to 211 bytes. Therefore, per sub-round, the embedded system can reduce the data volume of "256 bytes×four tables=1 Kbyte" to "211 bytes×four rearrangement numbers=844 bytes".

<<4. Example of Functional Configuration of Data Processing Apparatus>>

Figure 14:
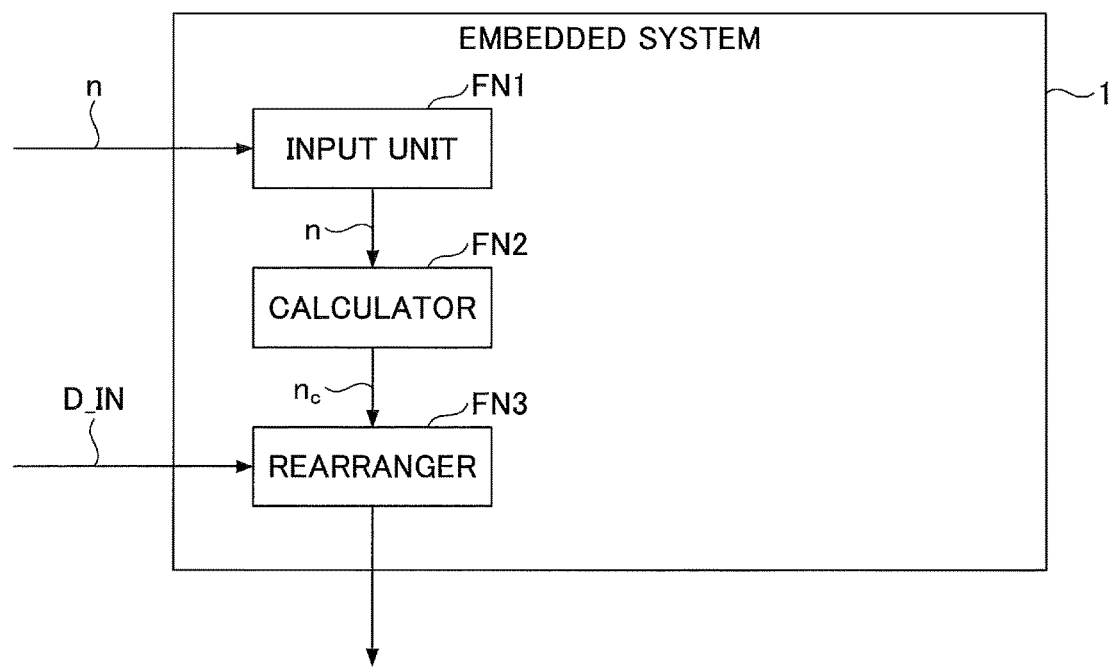
FIG. 14 is a functional block diagram illustrating an example of a functional configuration of an embedded system according to an embodiment.

FIG. 14 is a functional block diagram illustrating an example of a functional configuration of the embedded system 1 according to an embodiment. For example, the embedded system 1 is configured to include an input unit FN1, a calculator FN2, and a rearranger FN3.

The input unit FN1 receives as input a rearrangement number n with which a rearrangement pattern of input data D_IN can be specified. For example, the input unit FN1 is implemented by the I/F HW3 or the like (see FIG. 1).

The calculator FN2 calculates the rearrangement destination $n_c$ for each data item included in the input data D_IN based on the rearrangement number n. For example, the calculator FN2 is implemented by the processing unit HW1 or the like (see FIG. 1).

The rearranger FN3 rearranges the input data D_IN based on the rearrangement destinations $n_c$. For example, the rearranger FN3 is implemented by the processing unit HW1 or the like (see FIG. 1).

Note that as illustrated in FIG. 7 and the like, the calculator FN2 may be an identification unit to identify a table with which the input data D_IN can be converted in accordance with a rearrangement pattern corresponding to the rearrangement number n. For example, the identification unit is implemented by the processing unit HW1 or the like (see FIG. 1).

In addition, as illustrated in FIG. 10 and FIG. 11, the rearranger FN3 may be a selector to select data items among data included in the input data D_IN based on each rearrangement destination $n_c$ calculated based on the rearrangement number n. For example, the selector is implemented by the processing unit HW1 or the like (see FIG. 1).

Alternatively, as illustrated in FIG. 9, the embedded system 1 may be configured to include another calculator to receive a rearrangement pattern as input to calculate the rearrangement number n corresponding to the rearrangement pattern. For example, the other calculator is implemented by the processing unit HW1 or the like (see FIG. 1).

As such, by using the rearrangement number n, the embedded system 1 can calculate each rearrangement destination $n_c$ forming a predetermined rearrangement pattern, and can specify the table. In addition, the rearrangement number n is data whose volume is smaller than the table. Therefore, the embedded system 1 can make the data volume required for rearrangement smaller.

Note that the embedded system is not limited to the configuration implemented by one information processing apparatus. In other words, the embodiment in the present disclosure may be implemented by the embedded system which has one or more information processing apparatuses. Note that in the embedded system, a part or all of the processes may be executed distributedly, redundantly, concurrently, or a combined way of these.

Furthermore, the embodiment in the present disclosure may be implemented by a program causing a computer such as the embedded system to execute a method of processing data. In other words, the program here is a program causing a computer to execute the method of processing data according to the present invention, which is a computer program written in a programming language or the like.

Also, the program may be stored in recording media such as optical disks including Blu-ray (registered trademark) disks, flash memories, magnetic disks, and magneto-optical disks, to be distributed. Furthermore, the program may be distributed through electric telecommunication lines and the like.

So far, preferable embodiments of the present invention have been described, but note that the present invention is not limited to the embodiments specific as such. In other words, various changes and modifications are possible within the scope of the present invention described in the claims.

The invention claimed is:

1. A data processing apparatus for rearranging multiple items of data to be input, comprising:
    a processor;
    a memory; and
    wherein the processor is configured to:
receive a rearrangement number with which a rearrangement pattern of the data is can be identified, a number of the multiple items of the data being N and the rearrangement number specifying one rearrangement pattern of N! rearrangement patterns of the data;
    calculate a rearrangement destination for each of the items of the data based on the rearrangement number; and
rearrange the data based on the rearrangement destinations; and
wherein the data processing apparatus encrypts or decrypts the data by rearrangement based on the rearrangement number;
wherein all of the rearrangement patterns of the data is represented by the rearrangement number of log 2(N!) bits;
wherein the processor is configured to calculate a rearrangement destination $n_c$ for each of the data items, where c is a value representing the sequence number or position of each data item, using a following formula:

$$q(c=0)=n$$

$$q(c+1)=q(c)\div(N-c)$$

$$n_c=q(c)\bmod(N-c)$$

where n represents the rearrangement number, received by the user, with which the rearrangement pattern of the data is identified, and q (c) is a value representing the number of rearrangement destinations available for the data item at position c; and
wherein calculating the rearrangement destination for each item reduces the data volume stored in memory required for data rearrangement.

2. The data processing apparatus as claimed in claim 1, wherein the data processing apparatus is an embedded system.

3. The data processing apparatus as claimed in claim 1, wherein the rearrangement number is constituted with the rearrangement destinations of the items of the data.

4. A data processing apparatus for rearranging multiple items of data to be input, comprising:
    a processor;
    a memory; and
    wherein the processor is configured to:
receive a rearrangement number with which a rearrangement pattern of the data is can be identified, a number of the multiple items of the data being N and the rearrangement number n specifying one rearrangement pattern of N! rearrangement patterns of the data;
identify, based on the rearrangement number, a table for executing conversion in accordance with the rearrangement pattern; and
rearrange the data based on the table; and
wherein the data processing apparatus encrypts or decrypts the data by rearrangement based on the rearrangement number;
wherein all of the rearrangement patterns of the data is represented by the rearrangement number of log 2(N!) bits;
wherein the processor is configured to calculate a rearrangement destination $n_c$ for each of the data items, where c is a value representing the sequence number or position of each data item, using a following formula:

$$q(c=0)=n$$

$$q(c+1)=q(c)\div(N-c)$$

$$n_c=q(c)\bmod(N-c)$$

where n represents the rearrangement number, received by the user, with which the rearrangement pattern of the data is identified, and q (c) is a value representing the number of rearrangement destinations available for the data item at position c; and
wherein calculating the rearrangement destination for each item reduces the data volume stored in memory required for data rearrangement.

5. A data processing apparatus for rearranging multiple items of data to be input, comprising:
    a processor;
    a memory; and
    wherein the processor is configured to:
receive a rearrangement number with which a rearrangement pattern of the data is can be identified, a number of the multiple items of the data being N and the rearrangement number specifying one rearrangement pattern of N! rearrangement patterns of the data;
calculate a candidate value for each of the items of the data based on the rearrangement number; and
select the data based on the candidate values; and
wherein the data processing apparatus encrypts or decrypts the data by rearrangement based on the rearrangement number;
wherein all of the rearrangement patterns of the data is represented by the rearrangement number of log 2(N!) bits;
wherein the processor is configured to calculate a rearrangement destination $n_c$ for each of the data items, where c is a value representing the sequence number or position of each data item, using a following formula:

$$q(c=0)=n$$

$$q(c+1)=q(c)\div(N-c)$$

$$n_c=q(c)\bmod(N-c)$$

where n represents the rearrangement number, received by the user, with which the rearrangement pattern of the data is identified, and q (c) is a value representing the number of rearrangement destinations available for the data item at position c; and
wherein calculating the rearrangement destination for each item reduces the data volume stored in memory required for data rearrangement.

6. A data processing apparatus for rearranging multiple items of data to be input, comprising:
    a processor;
    a memory; and
    wherein the processor is configured to:
receive a rearrangement pattern of the data, a number of the multiple items of the data being N and a rearrangement specifying one rearrangement pattern of N! rearrangement patterns of the data;

calculate a rearrangement destination for each of the items of the data based on the rearrangement pattern; and
calculate the rearrangement number corresponding to the rearrangement pattern based on the rearrangement destinations; and
wherein the data processing apparatus encrypts or decrypts the data by rearrangement based on the rearrangement number;
wherein all of the rearrangement patterns of the data is represented by the rearrangement number of log 2(N!) bits;
wherein the processor is configured to calculate a rearrangement destination $n_c$ for each of the data items, where c is a value representing the sequence number or position of each data item, using a following formula:

$$q(c=0)=n$$

$$q(c+1)=q(c)\div(N-c)$$

$$n_c=q(c)\mathrm{mod}(N-c)$$

where n represents the rearrangement number, received by the user, with which the rearrangement pattern of the data is identified, and q (c) is a value representing the number of rearrangement destinations available for the data item at position c; and
wherein calculating the rearrangement destination for each item reduces the data volume stored in memory required for data rearrangement.

7. A method for processing data executed by a data processing apparatus for rearranging multiple items of data to be input, the method comprising:
receiving a rearrangement number with which a rearrangement pattern of the data is can be identified, a number of the multiple items of the data being N and the rearrangement number specifying one rearrangement pattern of N! rearrangement patterns of the data;
calculating a rearrangement destination for each of the items of the data based on the rearrangement number; and
rearranging the data based on the rearrangement destinations; and
wherein the method further comprises encrypting or decrypting the data by rearrangement based on the rearrangement number;
wherein all of the rearrangement patterns of the data is represented by the rearrangement number of log 2(N!) bits;
wherein the method further comprises calculating a rearrangement destination $n_c$ for each of the data items, where c is a value representing the sequence number or position of each data item, using a following formula:

$$q(c=0)=n$$

$$q(c+1)=q(c)\div(N-c)$$

$$n_c=q(c)\mathrm{mod}(N-c)$$

where n represents the rearrangement number, received by the user, with which the rearrangement pattern of the data is identified, and q (c) is a value representing the number of rearrangement destinations available for the data item at position c; and
wherein the calculating the rearrangement destination for each item reduces the data volume stored in memory required for data rearrangement.

8. A non-transitory computer-readable recording medium having a program stored therein for causing a computer to execute a method for processing data to rearrange multiple items of data to be input, the method comprising:
receiving a rearrangement number with which a rearrangement pattern of the data is can be identified, a number of the multiple items of the data being N and the rearrangement number specifying one rearrangement pattern of N! rearrangement patterns of the data;
calculating a rearrangement destination for each of the items of the data based on the rearrangement number; and
rearranging the data based on the rearrangement destinations; and
wherein the method further comprises encrypting or decrypting the data by rearrangement based on the rearrangement number;
wherein all of the rearrangement patterns of the data is represented by the rearrangement number of log 2(N!) bits;
wherein the method further comprises calculating a rearrangement destination $n_c$ for each of the data items, where c is a value representing the sequence number or position of each data item, using a following formula:

$$q(c=0)=n$$

$$q(c+1)=q(c)\div(N-c)$$

$$n_c=q(c)\mathrm{mod}(N-c)$$

where n represents the rearrangement number, received by the user, with which the rearrangement pattern of the data is identified, and q (c) is a value representing the number of rearrangement destinations available for the data item at position c; and
wherein the calculating the rearrangement destination for each item reduces the data volume stored in memory required for data rearrangement.

* * * * *